(12) United States Patent
Fuller et al.

(10) Patent No.: US 7,273,986 B2
(45) Date of Patent: Sep. 25, 2007

(54) TWO-PIECE PASS-THROUGH GROMMET FOR A MOTOR VEHICLE WIRING HARNESS

(75) Inventors: Steven W. Fuller, Leo, IN (US); Douglas A. Schlaudroff, Fort Wayne, IN (US); Jerald J. Bultemeier, Decatur, IN (US); Chad E. Jagger, Columbia City, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/234,732

(22) Filed: Sep. 23, 2005

(65) Prior Publication Data

US 2007/0068702 A1    Mar. 29, 2007

(51) Int. Cl.
  *H01B 17/26* (2006.01)
(52) U.S. Cl. ............... 174/153 G; 174/72 A; 174/152 G; 174/151; 174/48
(58) Field of Classification Search ......... 174/153 G, 174/72 A, 152 G, 650, 65 G, 151, 48, 668
  See application file for complete search history.

(56) References Cited

U.S. PATENT DOCUMENTS

| | | | |
|---|---|---|---|
| 5,015,804 A | * | 5/1991 | Nattel et al. ............ 174/65 SS |
| 5,270,487 A | | 12/1993 | Sawamura |
| 5,402,155 A | | 3/1995 | Hatayama et al. |
| 5,639,993 A | * | 6/1997 | Ideno et al. ............ 174/153 G |
| 5,675,128 A | * | 10/1997 | Simon .................... 174/152 G |
| 5,806,139 A | * | 9/1998 | Anderson et al. ............ 16/2.1 |
| 5,907,653 A | * | 5/1999 | Burek et al. ................ 385/135 |
| 6,402,155 B2 | | 6/2002 | Sakata |
| 6,627,817 B1 | * | 9/2003 | Kortenbach ............... 174/74 R |
| 6,642,451 B1 | * | 11/2003 | Gretz ....................... 174/65 G |

OTHER PUBLICATIONS

U.S. Appl. No. 11/207,459, filed Aug. 19, 2005, Fuller et al.

* cited by examiner

*Primary Examiner*—Jinhee Lee
(74) *Attorney, Agent, or Firm*—Jeffrey P. Calfa; Gerald W. Askew

(57) ABSTRACT

A wiring harness grommet (46) composed of first and second grommet halves (54, 56) cooperatively forming a walled through-passage (48) for a wire bundle of a wiring harness. Respective walled cavity halves (58, 60) are telescopically fit together for capturing the wire bundle between respective mutually confronting throats in the cavity halves. An annular void circumferentially surrounds the bundle and is filled with a filler (S) after the two halves have been fit together onto the bundle.

21 Claims, 8 Drawing Sheets

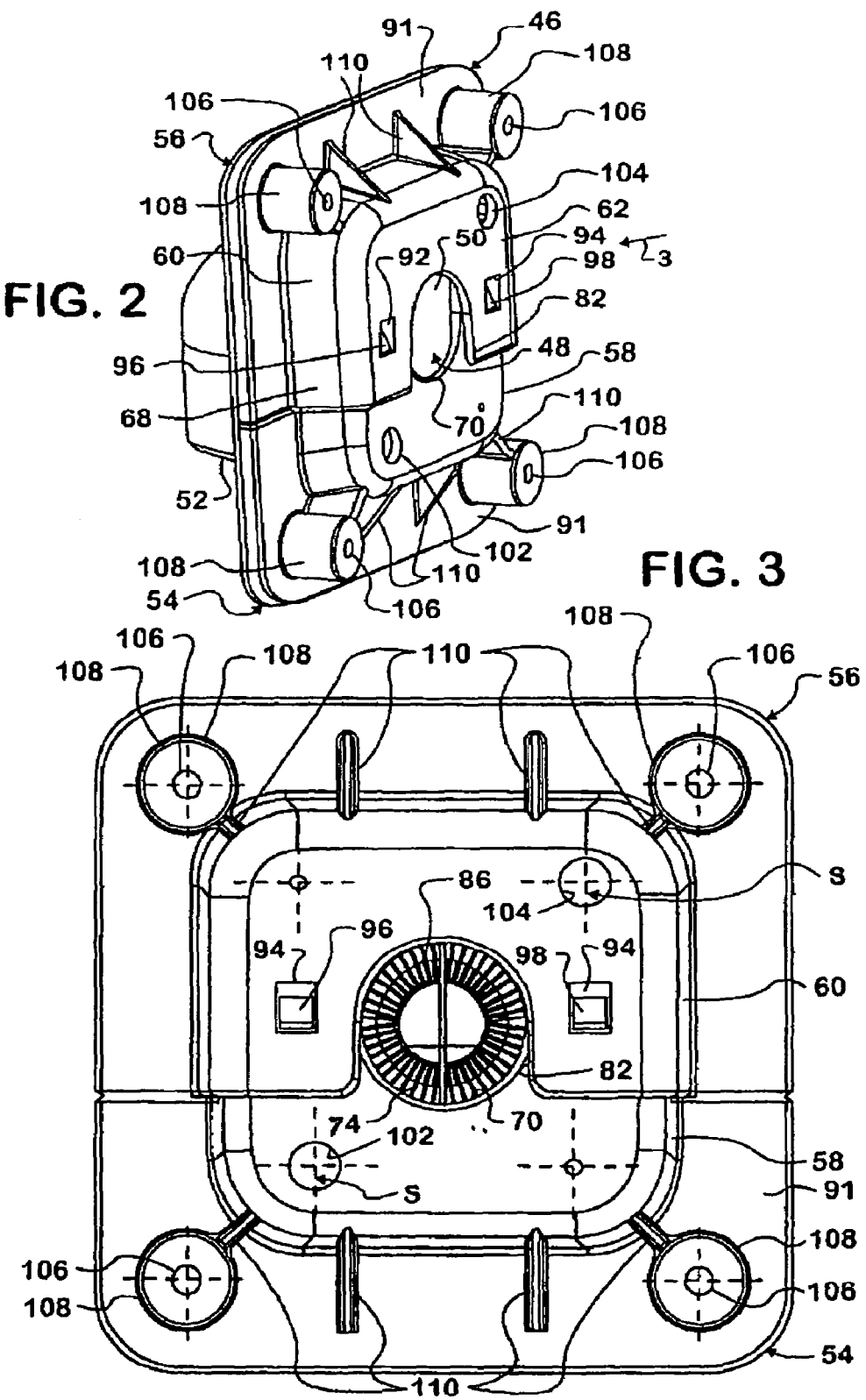

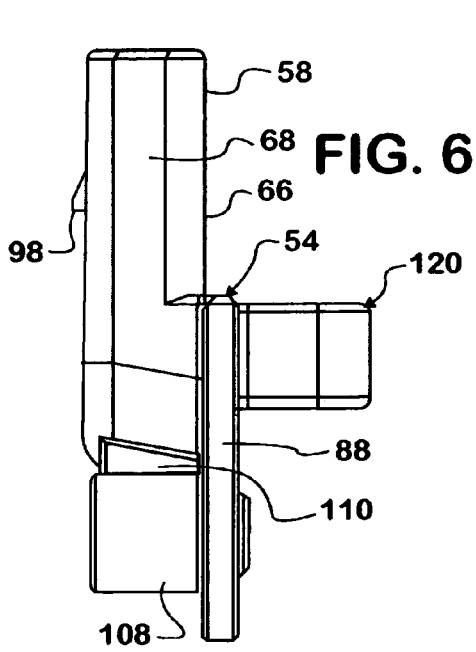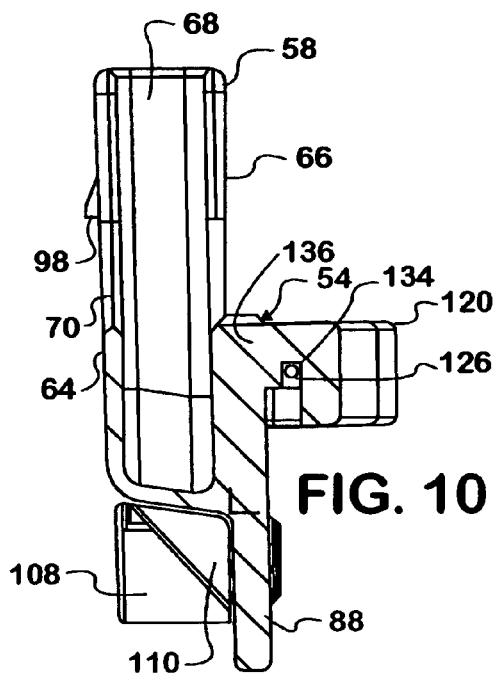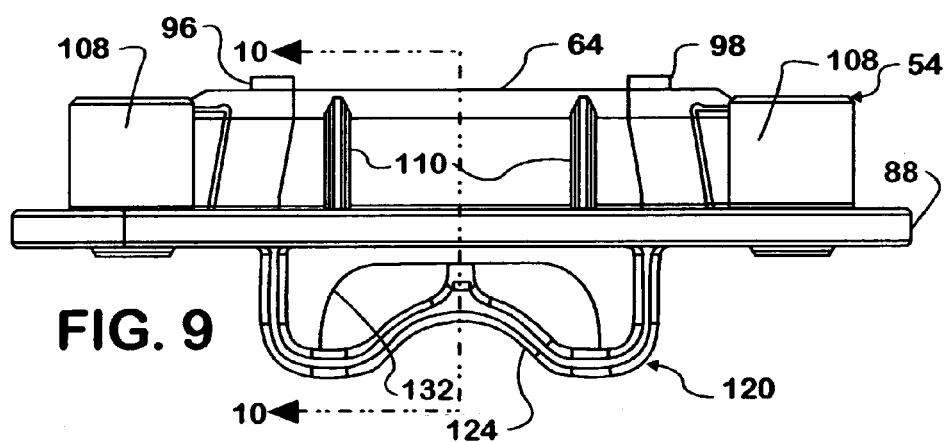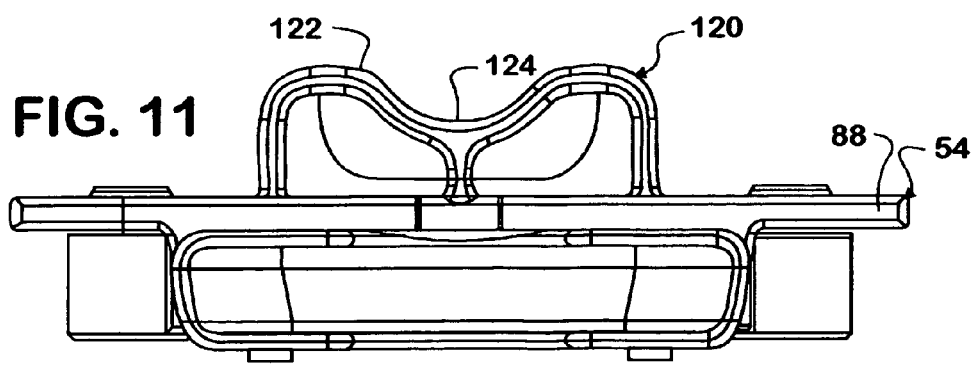

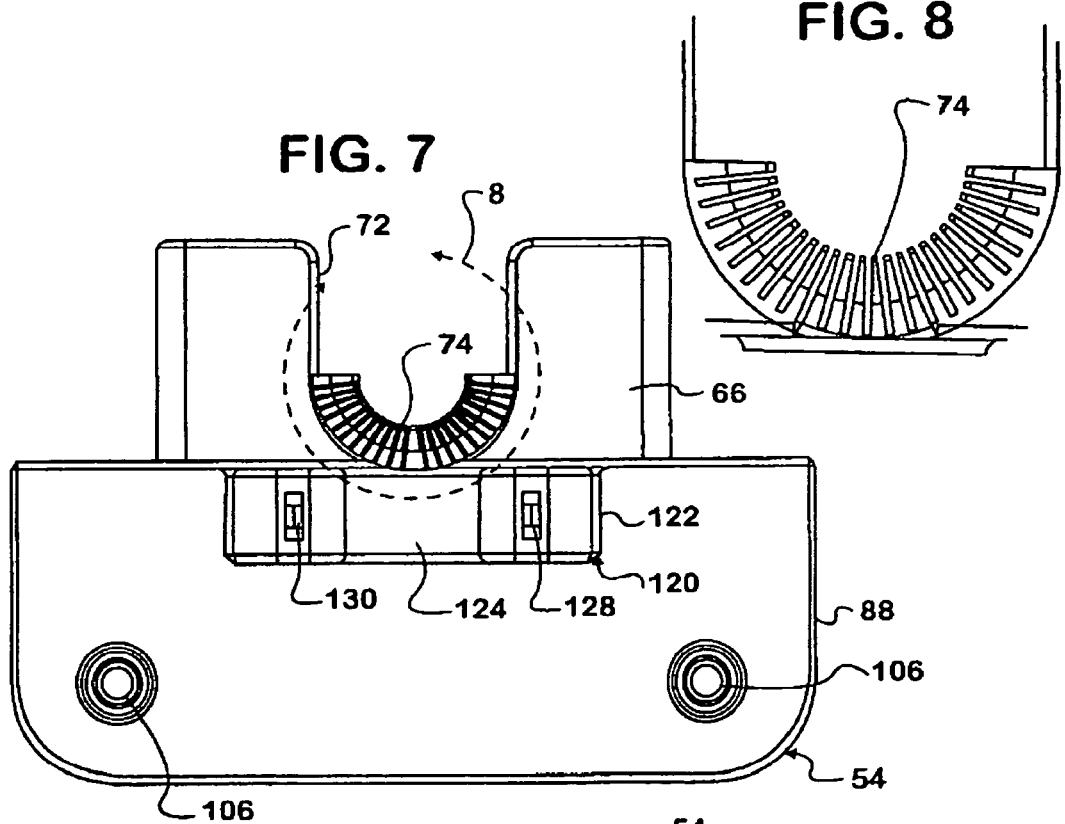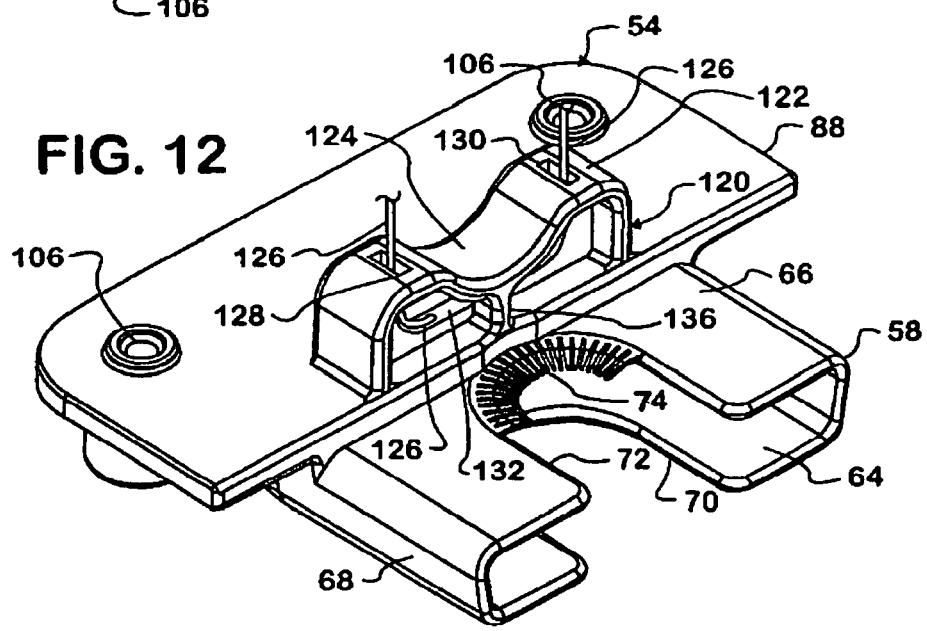

TWO-PIECE PASS-THROUGH GROMMET FOR A MOTOR VEHICLE WIRING HARNESS

FIELD OF THE INVENTION

This invention relates to motor vehicle wiring harnesses and a wiring harness grommet that requires neither molding of the grommet onto a wire bundle nor the stringing of wires through the grommet because the grommet comprises two halves that are assembled together to capture a wire bundle between them.

BACKGROUND OF THE INVENTION

Most motor vehicles that operate on roads and highways typically have an occupant compartment, where the driver and any passenger or passengers sit, and in front of the occupant compartment, an engine compartment for housing the engine that propels the vehicle.

Certain electrical devices, such as driver information displays and various controls, are present inside the occupant compartment. Certain ones of those devices need to be in electrical communication with vehicle components that are disposed outside the occupant compartment. Those components include the engine and the transmission through which the engine is coupled with the drivetrain.

Consequently it is common practice to bundle wires into wiring harnesses having some connectors that make connections to electrical devices inside the occupant compartment and other connectors that make connections to components that are outside the occupant compartment. Necessarily, such harnesses must pass through a wall shared by the two compartments. Such a wall is sometimes referred to as a dash panel, or simply a dash.

Because a number of vehicle components and systems are disposed on or in close proximity to the dash, available space for routing wiring harnesses through the dash is typically at a premium. The location of a wiring harness pass-through in the dash is not the only consideration in the design phase of motor vehicles; the nature of the pass-though is also a consideration.

One type of pass-through comprises a grommet that fits to a through-opening in the dash and through which bundled wires pass. Such a grommet may be affixed in some suitable way to the bundled wires so as to be immovable along the length of the harness. Installation of such a harness involves feeding one or more connectors through the through-opening and then pulling the harness until the grommet seats in the through-opening. In that type of pass-through, any connector that must be fed through the dash opening must be small enough in size to freely pass through.

Another type of pass-through is somewhat different in that the through-opening in the dash serves as the location where a harness that is inside the occupant compartment mates with a harness that extends into the engine compartment. Mating of the two harnesses is via one connector in one harness mating with another connector in the other harness at the dash. These are sometimes referred to as bulkhead connectors. For example, the occupant compartment harness can terminate in a connector that fits to the through-opening on one side of the dash and is mounted in any suitable way to the dash. The other harness terminates in a mating connector that plugs into the connector on the occupant compartment side of the dash. This type of pass-through is typically more expensive not only because the bulkhead connectors are required, but because other design and manufacturing issues often arise.

One of those other issues may be the sequence of steps in assembling a vehicle. Certain motor vehicles have what is sometimes called a body-frame construction. A frame provides the structure for mounting chassis components that form the vehicle powertrain. A body forms the occupant compartment, and at some point in the vehicle assembly process, the body is placed on and fastened to the frame. In the case of a truck, the body is sometimes referred to as the cab.

Assuming that many powertrain components, including the engine, transmission, and drivetrain, have been already mounted on the frame at the time that the body is placed on the frame, it then becomes necessary to make connection of engine compartment wiring harness connectors with corresponding occupant compartment wiring harness connectors. Available space considerations after body placement may render it difficult for assembly line personnel to efficiently make those connections.

Certain vehicle models that use essentially the same platform may have different electrical devices and components from vehicle to vehicle. Consequently, while the vehicles are generally similar, the wiring may differ from vehicle to vehicle. This means that some wiring harnesses may have more wires in a bundle and other harnesses fewer wires. Consequently, the diameter of a wiring harness passing through the dash in some vehicles will be larger than in others. The wiring harness through-openings in a dash panel are typically created at the time the dash panel is manufactured, typically by punching in sheet metal during the dash panel stamping process. While it would be possible to manufacture dash panels with different sized wiring harness through-openings, that would introduce complexities that would far outweigh the benefits. Therefore it is typical for a wiring harness through-opening in a dash that is common to different vehicle models to have a common size that can accommodate wire bundles of different diameters depending on the particular number and size of wires in a harness needed to satisfy requirements for the respective models and their electrical equipment.

Sealing of a grommet to bundled wires in a wiring harness may also be important in order to provide weather- and sound-tightness through the grommet. U.S. Pat. Nos. 5,270,487 and 6,402,155 are examples of grommets that have sealant within the grommet that aids in sealing to the wire bundle passing through the grommet opening.

An invention of the present inventors relating to a grommet, wiring harness, and installation in a motor vehicle is disclosed in pending U.S. patent application Ser. No. 11/207,459, filed Aug. 19, 2005.

The invention of that disclosure allows an occupant compartment wiring harness to extend through a dash and some distance into the engine compartment where it can be conveniently connected with a mating harness to electrically connect electrical devices inside the occupant compartment with vehicle components that are disposed outside the occupant compartment. The invention is especially suitable for use with pre-existing vehicle platforms and models to allow new electrical features, components, and devices to be incorporated without extensive re-design of major body components like a dash panel and cowl tray for example as well as major systems like a HVAC system that are closely integrated with the dash panel. Avoiding extensive structural re-design avoids the costs that would be associated with new or redesigned tooling.

A single size grommet can accommodate wiring harnesses of different diameters while enabling the grommet to be conveniently sealed to the wire bundle passing through it. The grommet also has a configuration that when installed in a dash through-opening directs the wire bundle generally downward upon entering the engine compartment thereby to shed away water, road splash, etc. so that intrusion of those elements into the occupant compartment is discouraged A wiring harness comprising such a grommet allows connections to be made inside the occupant compartment to electrical devices inside the occupant compartment and an engine compartment connector, or connectors, to be passed through a dash panel through-opening. On the engine side of the dash, the harness is pulled through until the grommet reaches the dash at which point it is manipulated to seat it in the through-opening. Preferably, the shape of the through-opening is polarized so that the grommet can seat in the through-opening in a specific orientation where the portion of the grommet on the engine compartment side of the dash will curve about 90° and extend generally downward.

The downwardly extending portion of the grommet on the engine compartment side forms a collar around the wire bundle, and by making the collar sufficiently deformable, it can be banded by a strap that girdles and is tightened around the collar to force the collar against bundle, thereby aiding in sealing the grommet to the bundle and in assuring that the grommet is located at a desired location along the length of the harness.

Because the grommet need not be molded onto the wire bundle, a wiring harness that includes the grommet can, within limits, comprise different numbers and sizes of wires. This allows such a harness to be fabricated at a harness maker by threading insulated wires individually, or in groups that may or may not be protectively wrapped, through the grommet, and connectors assembled to the stripped ends of the wires after the wires have been so threaded.

SUMMARY OF THE INVENTION

The invention of the present disclosure relates to a grommet that has a two-piece construction rather than the one-piece construction that is described in the inventors' prior patent application. While general principles of the present invention are believed applicable to various grommet designs and wiring harnesses, the particular grommet described here as an example of the inventive principles is used with a wiring harness that passes through a dash panel in a generally similar fashion to that shown in the prior patent application. In other words, the grommet is constructed to direct a wire bundle generally downward on the engine compartment side of the dash panel as the bundle exits the grommet.

The inventive grommet may be considered to comprise two separate halves that are assembled together to cooperate in providing a walled through-passage for a wire bundle of a wiring harness. After wires have been assembled to form the bundle, and then preferably protectively wrapped, the two grommet halves are positioned for assembly generally diametrically opposite each other with the wire bundle between them. Each half has a respective throat that is open toward the opposite throat. The two halves are constructed to come into mutual telescopic engagement as they are relatively advanced toward each other, causing the wire bundle to be captured between the confronting throats in the process. The point of full advancement is reached when catches at either side of the throats engage to prevent the two halves from being separated by pulling them apart in the opposite direction unless the catches are first released.

The semi-circular margin forming the inner end of each throat contains a generally semi-circular array of flexible finger-like elements extending a short distance into the throat. As the grommet halves are being advanced toward each other during assembly to a wire bundle, elements of the arrays come into contact with the wire bundle as the point at which the catches engage is approached. Further advancement to engage the catches causes the array elements to flex slightly and grip the bundle around opposite semi-circumferences. While the ability of the array elements to flex allows a given grommet size to accommodate some variations wire bundle diameter, certain grommets that embody more general principles of the invention need not have such arrays. Hence, the use of such array elements in any particular embodiment can be optional.

The elements in each array are sufficiently close to each other to form a sealant barrier at one wall of the grommet where the elements are gripping the bundle. The sealant barrier serves to contain sealant that is subsequently introduced into a void that is created inside the grommet through-passage and that surrounds the bundle after the two halves have been attached to each other via the catches. The introduction of sealant fill the void, and cures to both adhere the grommet to the bundle and create a weather-tight seal between the bundle and the surrounding grommet. By filling open space that would otherwise exist, the sealant also provides a noise barrier between an exterior compartment like the engine compartment and the vehicle interior.

The attached grommet halves collectively comprise a mounting flange surrounding the walled through-passage. The mounting flange is intended to be disposed against the margin of a through-opening in a wall of a motor vehicle through which the grommet and the wire bundle of a wiring harness pass. After one end of the wiring harness has been passed through the through-opening and the wiring harness pulled through to bring the grommet to the through-opening, the grommet is manipulated to insert one end into the through-opening. The grommet is then advanced further through the through-opening until the mounting flange abuts the margin of the through-opening. Fasteners can then be passed through mounting holes in the mounting flange and into the through-opening margin to secure the grommet to the vehicle wall.

The specific grommet disclosed here provides for that portion of the length of the walled through-passage that is inserted through the dash panel through-opening to comprise an elbow, or bend, that upon completion of installation of the grommet to the dash directs the wire bundle generally downward as the bundle exits the grommet and enters the engine compartment. The mounting flange abuts the interior side of the dash panel, and the particular arrangement for fastening it to the dash panel can be used to secure proper downward orientation of the elbow without the mounting flange necessarily having to be keyed to the shape of the dash panel through-opening. Without a need to key the grommet to the dash panel through-opening, more design freedom for the shape of the through-opening may be available, and that may be useful in facilitating insertion of the elbow through the through-opening.

One generic aspect of the present invention relates to a wiring harness grommet comprising a first grommet half and a second grommet half for cooperatively forming a walled through-passage for a wire bundle of a wiring harness and comprising respective walled cavity halves that can be telescopically fit together for capturing a wire bundle between respective mutually confronting throats in the cavity halves and creating a walled cavity having an annular void circumferentially surrounding the bundle.

Another generic aspect of the present invention relates to a motor vehicle comprising an occupant compartment, an engine compartment forward of the occupant compartment, and a wiring harness extending through a wall separating the two compartments from each other. A grommet is disposed on a wire bundle of the harness that passes through the grommet. The wall comprises a through-opening within which the grommet is disposed such that one end portion of the grommet is disposed in the occupant compartment and an opposite end portion is disposed in the engine compartment. The grommet comprises a first grommet half and a second grommet half comprising respective walled cavity halves that are telescopically fit together to create a walled cavity through which the wire bundle passes, and the walled cavity contains a cured material that was flowed into the cavity and allowed to cure to fill a void surrounding the bundle inside the walled cavity.

Still another generic aspect of the present invention relates to a motor vehicle wiring harness comprising a wire bundle having connectors at opposite ends and a grommet that comprises a through-passage through which the wire bundle passes. The grommet is disposed on the wire bundle intermediate the connectors at opposite ends and comprises a first grommet half and a second grommet half comprising respective walled cavity halves that are telescopically fit together to create a walled cavity through which the wire bundle passes. The walled cavity contains a cured material that was flowed into the cavity and allowed to cure to fill a void surrounding the bundle inside the walled cavity.

Still another generic aspect of the present invention relates to a method of making a motor vehicle wiring harness. The method comprises disposing first and second grommet halves on diametrically opposite sides of a wire bundle, relatively advancing the grommet halves toward each other to capture the wire bundle between confronting throats in walls of respective walled cavity halves of the grommet halves while the cavity halves form a void around the wire bundle inside a cavity cooperatively formed by the cavity halves, flowing a filler into the cavity to fill the void, and allowing the filler to cure.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 2 is a perspective view showing the grommet by itself.

FIG. 3 is a front elevation view in the direction of arrow 3 in FIG. 2 on an enlarged scale.

FIG. 6 is a right side elevation view of FIG. 5.

FIG. 7 is a rear view of FIG. 5.

FIG. 8 is an enlarged view in circle 8 of FIG. 7.

FIG. 9 is a bottom view of FIG. 5.

FIG. 10 is a cross section view taken in the direction of arrows 10-10 in FIG. 9.

FIG. 11 is a top view of FIG. 5.

FIG. 12 is another perspective view of one grommet half.

DESCRIPTION OF THE PREFERRED EMBODIMENT

Figure 1:
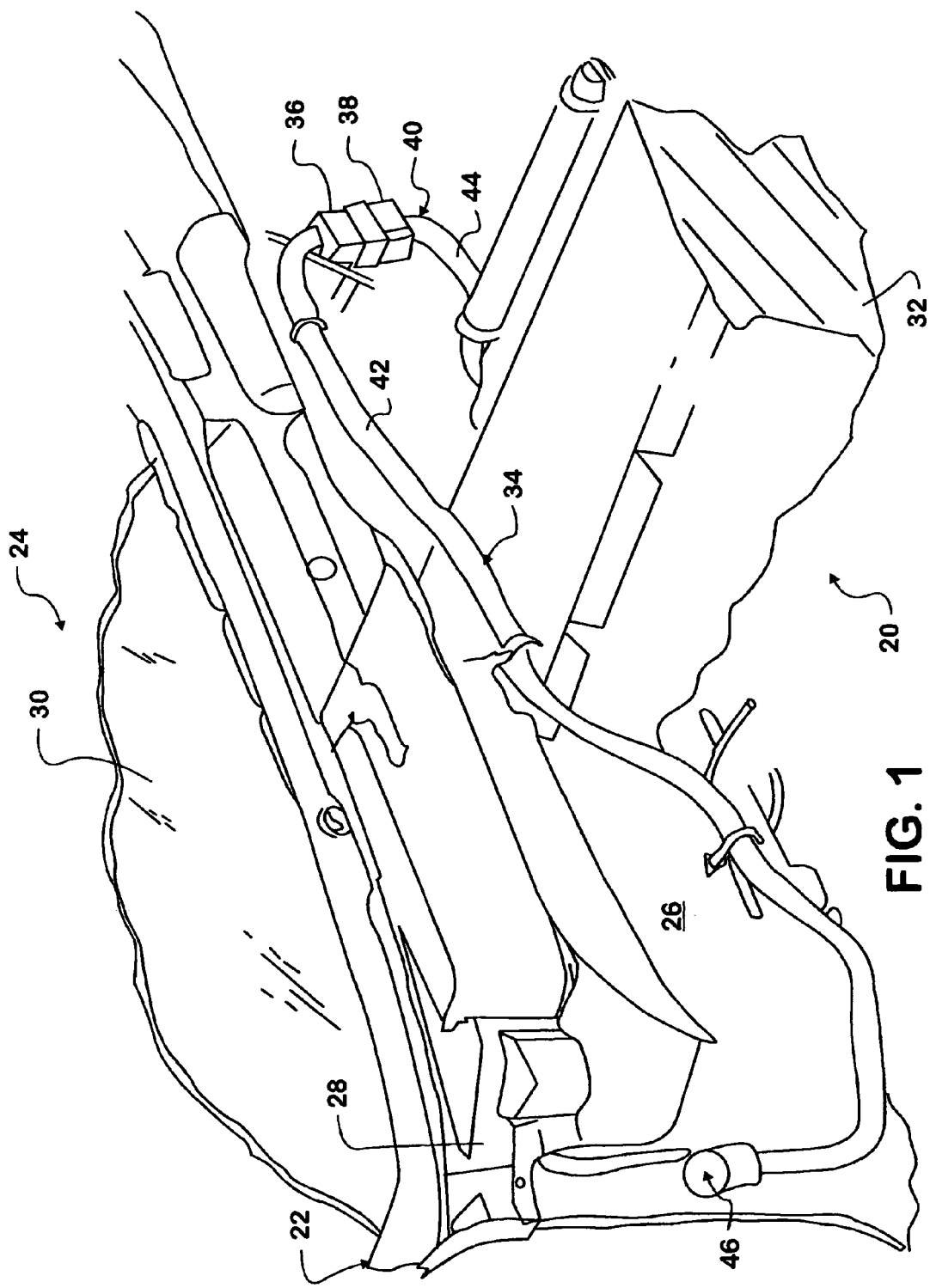
FIG. 1 is a perspective view of a portion of the interior of a truck's engine compartment showing a portion of a wiring harness, including a two-piece grommet, embodying principles of the invention.

FIG. 1 shows a portion of an engine compartment 20 of a highway truck 22 that is forward of an occupant compartment 24. A dash 26 separates the two compartments below a cowl area 28 and windshield 30. Engine compartment 20 houses an engine 32 that forms part of the truck's powertrain.

One portion of a wiring harness 34 is disposed inside occupant compartment 24 and can't be specifically seen in FIG. 1. Another portion of wiring harness 34 is disposed in engine compartment 20 and can be seen in FIG. 1. The latter portion extends from dash 26 some distance into engine compartment 20 where it terminates in a connector 36 shown mated with another connector 38. Connector 38 is part of an engine/powertrain wiring harness 40 that has other connectors (not visible in FIG. 1) that connect with vehicle electrical components that are disposed either in engine compartment 20 or the underlying chassis. With the two harnesses 34, 40 connected together, electrical devices inside occupant compartment 24 are electrically connected with electrical components outside the occupant compartment.

Each harness 34, 40 comprises a respective wire bundle 42, 44 that may be protectively wrapped. Harness 34 further comprises a grommet 46 that mounts the harness on dash 26 on a lateral side of the vehicle fore-aft centerline opposite the side where connectors 36, 38 make connection to each other. Grommet 46 has a construction that directs wire bundle 42 generally downward as it enters engine compartment 20. Grommet 46 is shown by itself in more detail in the remaining Figures.

Those Figures show grommet 46 to comprise a two-piece construction that provides a through-passage 48 having opposite ends 50 and 52 where wire bundle 42 enters and exits. The two-piece construction comprises a first grommet half 54, shown in FIGS. 3-7 and a second grommet half 56 shown in FIGS. 8-13.

Grommet half 54 comprises a walled cavity half 58, and grommet half 56, a walled cavity half 60. The walled cavities 58, 60 are arranged and constructed to telescopically fit together for capturing the wire bundle between respective mutually confronting throats in the cavity halves and creating a walled cavity 62 having an annular void circumferentially surrounding the bundle.

Cavity half 58 comprises a front wall 64 and a rear wall 66 spaced rearward of, but essentially parallel to, wall 64. As viewed in front and rear elevation, the walls 64, 66 are basically U-shaped. Walls 64, 66 are joined with each other along their outer side and bottom margins by a three-sided side wall 68 that is essentially perpendicular to walls 64, 66.

Figure 4:
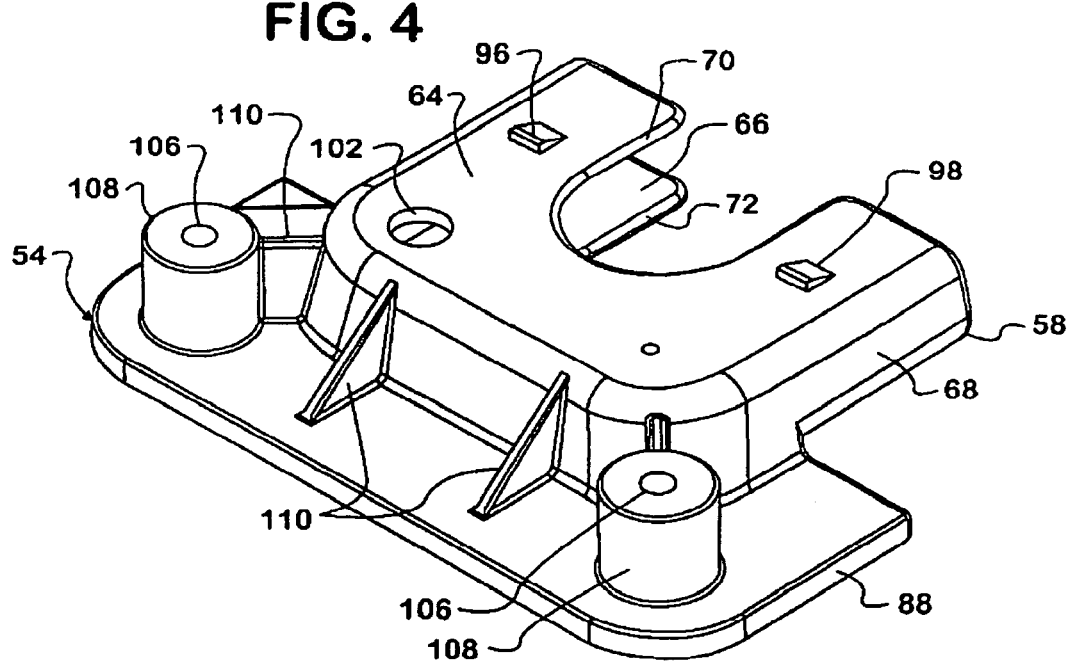
FIG. 4 is a perspective view of one grommet half by itself.
Figure 5:
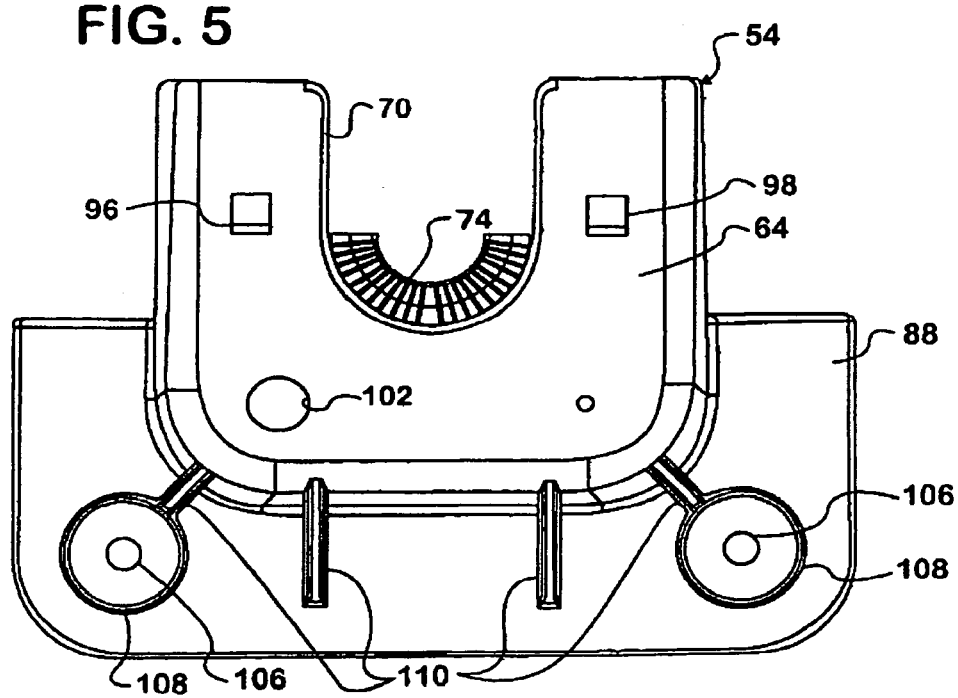
FIG. 5 is a front elevation view of the one grommet half.
Figure 13:
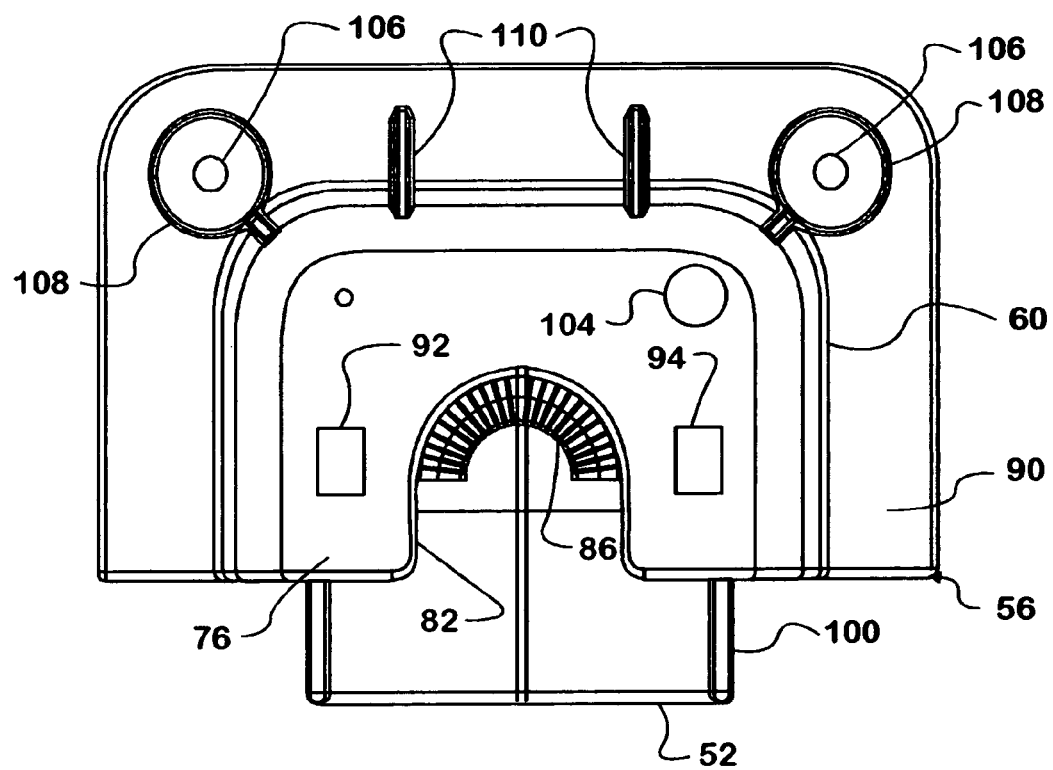
FIG. 13 is a front elevation view of the other grommet half.
Figure 14:
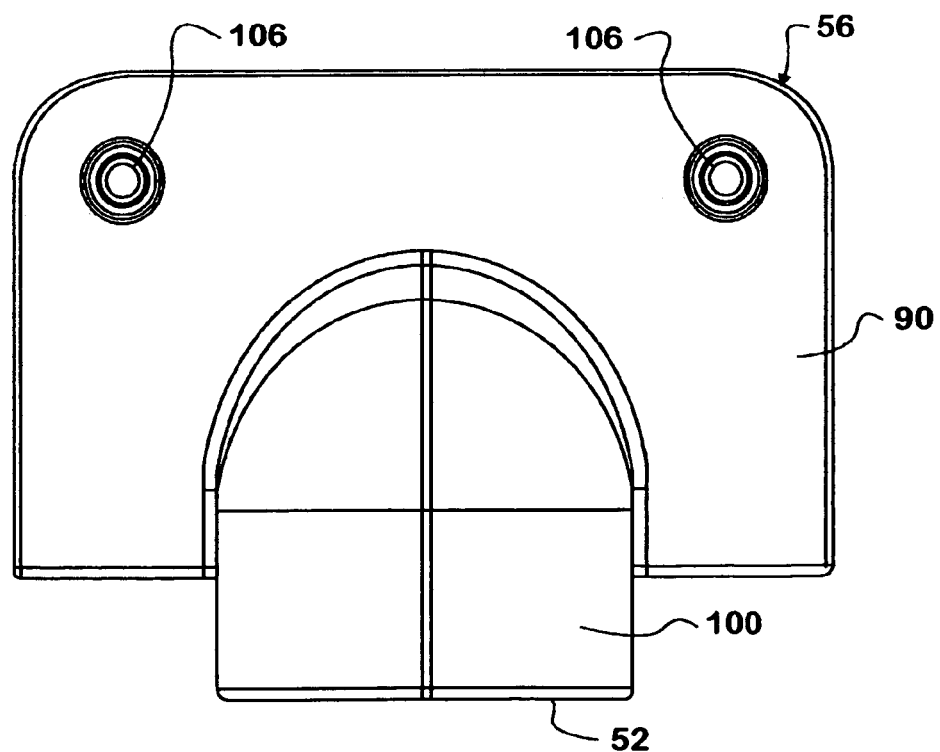
FIG. 14 is a rear view of FIG. 13.
Figure 15:
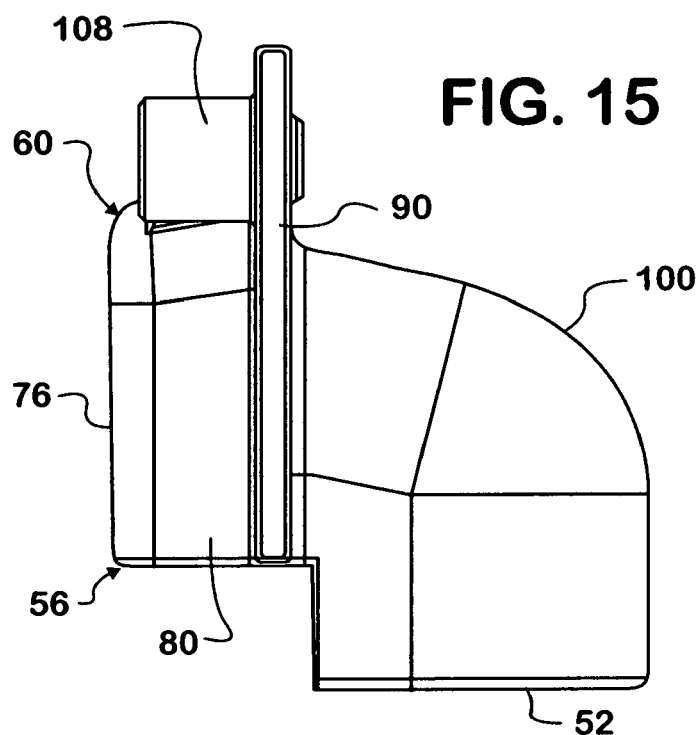
FIG. 15 is a right side view of FIG. 13.
Figure 19:
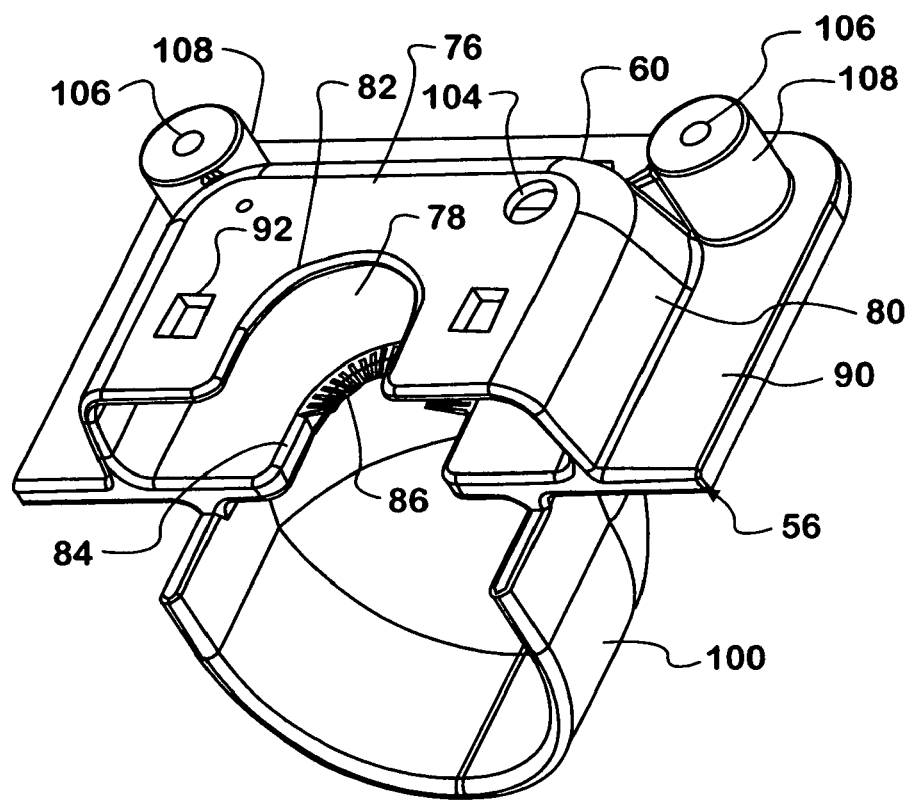
FIG. 19 is a perspective view of the other grommet half.
Figure 16:
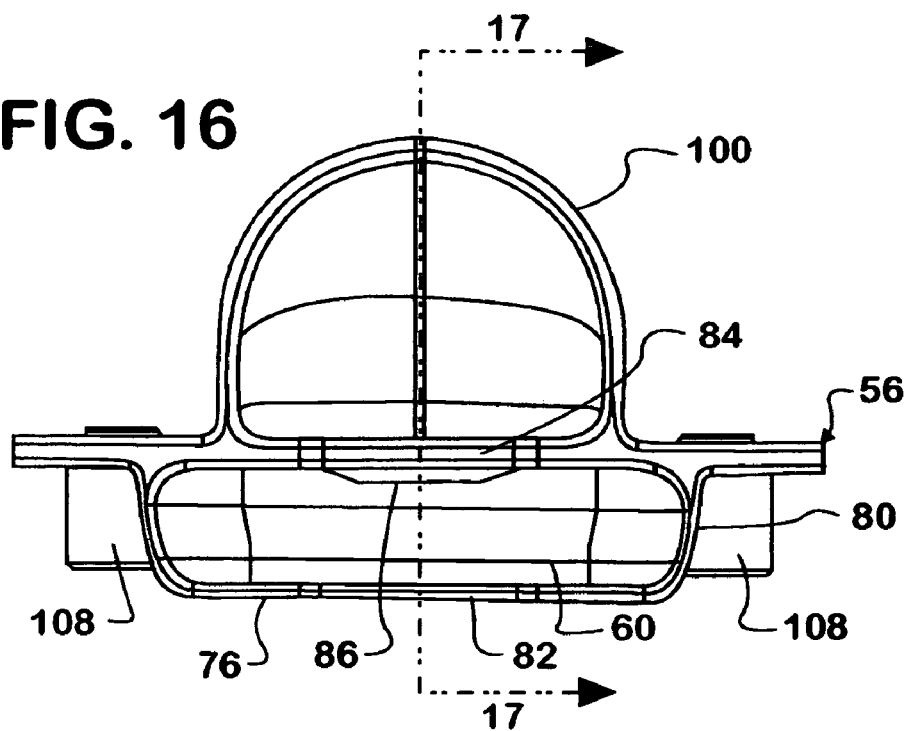
FIG. 16 is a bottom view of FIG. 13.
Figure 17:
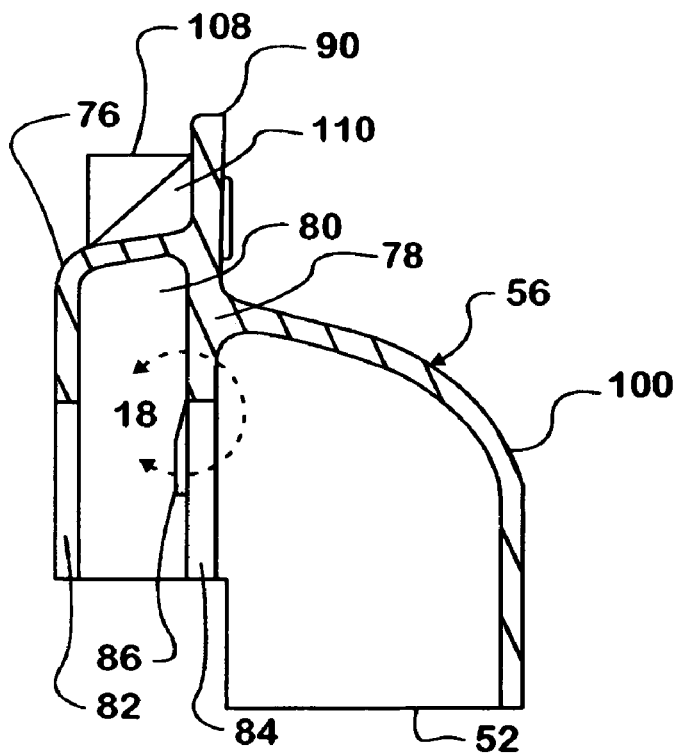
FIG. 17 is a cross section view taken in the direction of arrows 17-17 in FIG. 16.
Figure 18:
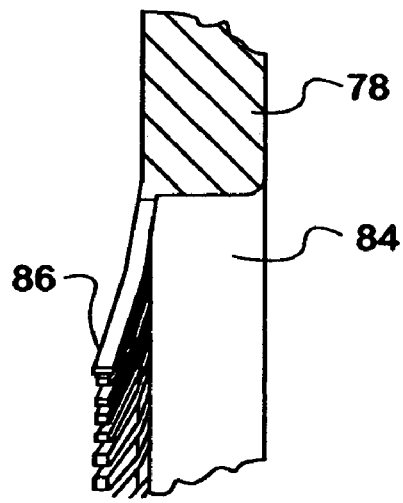
FIG. 18 is an enlarged view in circle 18 of FIG. 17.

The U-shapes of walls 64, 66 are further defined by respective throats 70, 72 that are in substantial alignment as can be seen by viewing FIGS. 4 and 6. The upper end of each throat is open, and the sides are parallel. The inner end of each throat comprises a generally semi-circular margin. That margin of throat 72 comprises a generally semi-circular array 74 of flexible finger-like elements extending a short distance into the throat.

Hence, walled cavity half 58 has an open top and is also open at the two throats 70, 72.

Cavity half 60 comprises a front wall 76 and a rear wall 78 spaced rearward of, but essentially parallel to, wall 76. As viewed in front and rear elevation, walls 76, 78 are basically inverted U-shaped. Walls 76, 78 are joined with each other along their outer side and top margins by a three-sided wall 80 that is essentially perpendicular to walls 76, 78.

The inverted U-shapes of walls 76, 78 are further defined by respective throats 82, 84 that are in substantial alignment. The lower end of each throat 82, 84 is open, and the sides are parallel. The inner end of each throat 82, 84 comprises a generally semi-circular margin. That margin of throat 84 comprises a generally semi-circular array 86 of flexible finger-like elements extending a short distance into the throat.

Hence, walled cavity half 60 has an open bottom and is also open at the two throats 82, 84.

The walled cavity halves 58, 60 are dimensioned for telescopically fitting together, as shown by FIG. 2. In this particular embodiment, cavity half 58 is slightly smaller so that it telescopes into cavity half 60.

Grommet half 54 further comprises a half flange 88 that adjoins rear wall 66 and is generally coextensive with the three sides of side wall 68 on the outside of walled cavity half 58, running along one side, then the bottom, and then the opposite side. Similarly grommet half 56 comprises a half flange 90 that adjoins rear wall 78 and is generally coextensive with the three sides of side wall 80 on the outside of walled cavity half 60, running along one side, then the top, and then the opposite side. The respective half flanges 88, 90 are arranged to cooperate in forming a full circumferential flange 91 around walled cavity 62 when the walled cavity halves 58, 60 are fully telescopically fit together.

The grommet halves 54, 56 comprise respective features for mutual coaction when walled cavity halves 58, 60 are fully telescopically fit together to prevent them from untelescoping. Those features provide two sets of catches at either side of throats 70 and 82. Wall 76 has two rectangular holes 92, 94 to either side of throat 82 and wall 64 has two catches 96, 98 to either side of throat 70. Catches 96, 98 normally protrude from wall 64, but during assembly of the two grommet halves to each other, they are flexed back toward wall 64 as they come into contact with and ride along wall 76. At full assembly, the catches register with holes 92, 94 and flex into the holes so as to catch on edges of the holes and prevent the two grommet halves from being untelescoped unless both catches are first released.

Immediately to the rear of wall 78, grommet half 56 comprises a wall forming a downwardly curved elbow 100 forming a continuation of through-passage 48 that as shown in FIG. 1 directs the wire bundle downward into the engine compartment.

Each grommet half also has a respective through-opening 102, 104 in its respective front wall 64, 76. It is through these through-openings 102, 104 that a sealant is flowed (as represented by the arrows S) to seal the grommet to the wire bundle.

The grommet halves 54, 56 and a wire bundle are assembled together in the following way.

Grommet halves 54, 56 are disposed on diametrically opposite sides of the wire bundle with the open top of walled cavity 58 and the open bottom of walled cavity 60 confronting each other and with the throats aligned with the wire bundle. The two halves are then advanced relative to one another to fit walled cavity half 58 inside walled cavity half 60 capturing the wire bundle in the throats in cavity walls 64, 66, 76, 78. Throats 70, 82 capture the wire bundle at the front end of the grommet and throats 66, 78 capture the bundle more rearward. Elbow 100 forces the wire bundle to curve as the bundle passes out of walled cavity 62 through throats 72, 84.

Further advancement more fully telescopes the two cavity halves and forces arrays 74, 86 against opposite semi-circumferences of the bundle at the rear cavity wall that is cooperatively formed by walls 66, 78. At full telescoping, catches 96, 98 catch in holes 92, 94. Walled cavity 62 is constructed and arranged to leave an interior annular void surrounding the wire bundle. Through-openings 102, 104 are open to this void.

A filler, such as a suitable sealant, is then flowed into the cavity interior to fill the void, and allowed to cure. The fingers of arrays 74, 86 provide a barrier that resists flow of filler through the rear cavity wall. When cured, the filler provides attachment of the grommet to the wire bundle, while forming a weather-tight seal of the grommet to the wire bundle, and also a noise barrier through the grommet.

An example of a suitable sealant for the filler is an advanced polyurethane, such as Arathane® CY 8877 manufactured by Vantico Inc., Brewster, N.Y.

Grommet half 54 comprises a horizontal ledge 120 that with the two grommet halves assembled together protrudes from half flange 88 a short distance into the space enclosed by the wall of elbow 100 to provide support for the wire bundle as the bundle passes out of cavity 62 into the space enclosed by the elbow. A vertical wall 122 of ledge 120 that is distal to half flange 88 comprises a curved indentation 124 for centrally locating the beginning curvature of the wire bundle. The construction of ledge 120 comprises further features that allow the bundle to be tied to the ledge by a tie 126 that is partially shown in FIGS. 10 and 12. Tying the bundle to the grommet may be beneficial to the assembly process.

Immediately adjacent the ends of indentation 124, wall 122 comprises through-holes 128, 130, each of rectangular cross section. Ledge 120 is partially open at top and bottom to provide for grommet half 54 to be fabricated with an interior that includes a guide providing a guide surface 132 for guiding passage of tie 126 through the ledge interior.

Prior to the two grommet halves being assembled together, one end of tie 126 is inserted from the outside of wall 122 into one of the two through-holes 128, 130. The tie is sufficiently rigid, yet flexible, to allow it to be pushed into the entrance through-hole and guided by guide surface 132 to make a right angle bend and pass through a small opening 134 (FIG. 10) in a bridge wall 136 that joins the bottom of indentation 124 with half flange 88. Further advancement of the tie along guide surface 132 causes the tie to make a second right angle bend and pass out of the ledge through the other through-hole.

The tie has sufficient overall length to allow its ends to wrap around the wire bundle and be tied together to securely hold the wire bundle in place in indentation 124. Grommet half 54 can be placed on the wire bundle either before or after threading of the tie through the ledge.

With the grommet assembled to the harness, the harness can be installed in a vehicle. Flange 91 is intended to be disposed against the margin of a through-opening in a wall of the vehicle through which the grommet and the wire bundle of a wiring harness pass. After one end of the wiring harness has been passed through the through-opening and the wiring harness pulled through to bring grommet 46 to the through-opening, the grommet is manipulated to insert one end into the through-opening. In the case of the installation shown in FIG. 1, flange 91 will be on the occupant compartment side of the dash.

Grommet 46 is then manipulated into the through-opening in the dash until flange 91 abuts the margin of the through-opening. Fasteners such as screws can then be passed through holes 106 in flange 91 and into the through-opening margin to secure the grommet to the dash. Holes 106 are located at the four corners of flange 91 and extend through bosses 108 formed as part of the half flanges in the respective grommet halves perpendicular to the half flanges.

The grommet halves are fabricated by known injection molding processes so that features like those described are included in the respective halves. Additional features include triangular braces 110 at various locations.

While a presently preferred embodiment of the invention has been illustrated and described, it should be appreciated that principles of the invention apply to all embodiments falling within the scope of the following claims.

What is claimed is:

1. A wiring harness grommet comprising:
a first grommet half and a second grommet half for cooperatively forming a walled through-passage for a wire bundle of a wiring harness and comprising respective first and second walled cavity halves that can be telescopically fit together for capturing a wire bundle between respective mutually confronting throats in the cavity halves and creating a walled cavity having an annular void circumferentially surrounding the bundle, wherein each walled cavity half comprises a respective pair of walls that are spaced apart along the length of the through-passage and each of which walls contains a portion of the respective throat, and each wall of the pair of walls of the first cavity half is arranged for cooperation with a corresponding wall of the second cavity half for bounding the cavity along the length of the through-passage.

2. A wiring harness grommet as set forth in claim 1 wherein the grommet halves comprise respective features for mutual coaction when the walled cavity halves are fully telescopically fit together to prevent them from untelescoping.

3. A wiring harness grommet as set forth in claim 1 wherein the first grommet half further comprises a half flange adjoining one of the pair of walls of the first walled cavity half, the second grommet half comprises a half flange adjoining the one of the pair of walls of the second walled cavity half that cooperates with the one of the pair of walls of the first walled cavity half to bound the cavity along the length of the through-passage, and the respective half flanges are arranged to cooperate in forming a full circumferential flange around the walled cavity when the walled cavity halves are fully telescopically fit together.

4. A wiring harness grommet as set forth in claim 3 wherein the first grommet half comprises an elbow that forms a continuation of the through-passage on a side of the half flange of the first grommet half opposite the first walled cavity half.

5. A wiring harness grommet as set forth in claim 1 wherein the throat portion of one of the pair of walls of the first walled cavity half and the throat portion of the corresponding wall of the second walled cavity half comprise respective inner ends having generally semi-circular margins and open outer ends opposite the inner ends, and each generally semi-circular margin comprises a generally semi-circular array of flexible finger-like elements extending a short distance into the respective throat portion.

6. A wiring harness grommet as set forth in claim 5 wherein the other of the pair of walls of the first walled cavity half and the corresponding wall of the second walled cavity half comprise respective features for mutual coaction when the walled cavity halves are fully telescopically fit together to prevent them from untelescoping.

7. A wiring harness grommet as set forth in claim 6 wherein the other of the pair of walls of the first walled cavity half and the corresponding wall of the second walled cavity, half comprise respective through-holes open to the annular void when the walled cavity halves are fully telescopically fit together.

8. A motor vehicle comprising:
an occupant compartment;
an engine compartment forward of the occupant compartment;
and a wiring harness extending through a wall separating the two compartments from each other and comprising a grommet that is disposed on a wire bundle that passes through the grommet;
the wall comprising a through-opening within which the grommet is disposed such that one end portion of the grommet is disposed in the occupant compartment and an opposite end portion is disposed in the engine compartment; and
the grommet comprising a first grommet half and a second grommet half comprising respective first and second walled cavity halves that have been telescopically fit together from diametrically opposite sides of the wire bundle to create a walled cavity through which the wire bundle passes, and the walled cavity contains a cured material that was flowed into the cavity and allowed to cure to fill a void surrounding the bundle inside the walled cavity.

9. A motor vehicle as set forth in claim 8 wherein the end portion of the grommet that is disposed in the engine compartment comprises a downwardly directed elbow from which the bundle enters the engine compartment.

10. A motor vehicle as set forth in claim 9 wherein the through-opening is disposed to one lateral side of a fore-aft centerline of the vehicle, and the wire bundle has a length extending from the grommet to terminate in one or more connectors connecting to one or more mating connectors of another wiring harness on the other lateral side of the vehicle fore-aft centerline.

11. A motor vehicle as set forth in claim 10 wherein the another wiring harness comprises a powertrain wiring harness comprising the one or more mating connectors of another wiring harness and those one or more mating connectors are mated with the one or more connectors of the wire bundle to connect wires in the wire bundle to one or more powertrain electrical components.

12. A motor vehicle as set forth in claim 8 wherein the first grommet half comprises a catch catching the first and second grommet halves to each other.

13. A motor vehicle as set forth in claim 8 wherein each walled cavity half comprises a respective pair of walls that are spaced apart along the length of the through-passage, and each of the pair of walls of the first walled cavity half is arranged for cooperation with a corresponding wall of the second walled cavity half for bounding the cavity along the length of the through-passage, and the cooperating walls contain respective throats cooperating in capturing the wire bundle.

14. A motor vehicle as set forth in claim 13 wherein the first grommet half further comprises a half flange adjoining one of the pair of walls of the first walled cavity half, the second grommet half comprises a half flange adjoining the one of the pair of walls of the second walled cavity half that cooperates with the one of the pair of walls of the first walled cavity half to bound the cavity along the length of the through-passage, and the respective half flanges are arranged to cooperate in forming a full circumferential flange around the walled cavity that is disposed against and attached to the wall separating the two compartments.

15. A motor vehicle as set forth in claim 13 wherein the throat of one of the pair of walls of the first walled cavity half and the throat of the corresponding wall of the second walled cavity half comprise respective inner ends having generally semi-circular margins and open outer ends opposite the inner ends, and each generally semi-circular margin comprises a generally semi-circular array of flexible finger-like elements extending a short distance into the respective throat portion and bearing against a semi-circumference of the wire bundle.

16. A motor vehicle as set forth in claim 15 wherein the other of the pair of walls of the first walled cavity half and the corresponding wall of the second walled cavity half comprise respective through-holes through which the cured material filling the void was introduced into the cavity.

17. A motor vehicle wiring harness comprising:
a wire bundle having connectors at opposite ends; and
a grommet that comprises a through-passage through which the wire bundle passes and that is disposed on the wire bundle intermediate the connectors at opposite ends;
wherein the grommet comprises a first grommet half and a second grommet half comprising respective first and second walled cavity halves that are telescopically fit together to create a walled cavity through which the wire bundle passes, and the walled cavity contains a cured material that was flowed into the cavity and allowed to cure to fill a void surrounding the bundle inside the walled cavity, wherein each walled cavity half comprises a respective pair of walls that are spaced apart along the length of the through-passage, and each wall of the pair of walls of the first walled cavity half is arranged for cooperation with a corresponding wall of the pair of walls of the second walled cavity half for bounding the cavity along the length of the through-passage, and each of the cooperating walls contains a respective throat cooperating in capturing the wire bundle.

18. A motor vehicle wiring harness as set forth in claim 17 wherein the first grommet half comprises a catch catching the first and second grommet halves to each other.

19. A motor vehicle wiring harness as set forth in claim 17 wherein the first grommet half further comprises a half flange adjoining one of the pair of walls of the first walled cavity half, the second grommet half comprises a half flange adjoining the one of the pair of walls of the second walled cavity half that cooperates with the one of the pair of walls of the first walled cavity half to bound the cavity along the length of the through-passage, and the respective half flanges are arranged to cooperate in forming a full circumferential flange around the walled cavity.

20. A motor vehicle wiring harness as set forth in claim 17 wherein the throat of one of the walls of the pair of walls of the first walled cavity half and the throat of the corresponding wall of the pair of walls of the second walled cavity half comprise respective inner ends having generally semi-circular margins and open outer ends opposite the inner ends, and each generally semi-circular margin comprises a generally semi-circular array of flexible finger-like elements extending a short distance into the respective throat portion and bearing against a semi-circumference of the wire bundle.

21. A motor vehicle wiring harness as set forth in claim 20 wherein the other of the pair of walls of the first walled cavity half and the corresponding wall of the second walled cavity half comprise respective through-holes through which the cured material filling the void was introduced into the cavity.

* * * * *